United States Patent
Jardine

(10) Patent No.: US 7,160,384 B2
(45) Date of Patent: Jan. 9, 2007

(54) AMINE-CONTAINING CEMENT PROCESSING ADDITIVES

(75) Inventor: Leslie A. Jardine, Salem, MA (US)

(73) Assignee: W.R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/530,437

(22) PCT Filed: Oct. 2, 2003

(86) PCT No.: PCT/US03/31364

§ 371 (c)(1),
(2), (4) Date: Apr. 6, 2005

(87) PCT Pub. No.: WO2004/033386

PCT Pub. Date: Apr. 22, 2004

(65) Prior Publication Data

US 2006/0086291 A1    Apr. 27, 2006

Related U.S. Application Data

(60) Provisional application No. 60/417,385, filed on Oct. 9, 2002.

(51) Int. Cl.
*C04B 24/12* (2006.01)

(52) U.S. Cl. .................. 106/808; 106/727; 106/739; 106/764; 106/823; 241/30

(58) Field of Classification Search ................ 106/727, 106/808, 823, 739, 764; 241/30
See application file for complete search history.

(56) References Cited

U.S. PATENT DOCUMENTS

| | | | | |
|---|---|---|---|---|
| 4,401,472 A | 8/1983 | Gerber | ................... | 106/727 |
| 4,473,405 A | 9/1984 | Gerber | ................... | 106/725 |
| 4,877,450 A | 10/1989 | Brasch | ................... | 106/1.26 |
| 4,943,323 A | 7/1990 | Gartner | ................... | 106/808 |
| 4,990,190 A | 2/1991 | Myers et al. | ................... | 106/727 |
| 5,017,234 A | 5/1991 | Gartner | ................... | 106/787 |
| 5,084,103 A | 1/1992 | Myers et al. | ................... | 106/727 |
| 5,429,675 A | 7/1995 | Cheung et al. | ................... | 106/802 |
| 5,605,571 A | 2/1997 | Buerge et al. | ................... | 106/808 |
| 5,720,796 A | 2/1998 | Cheung et al. | ................... | 75/746 |
| 5,916,483 A | 6/1999 | Burge | ................... | 252/390 |
| 6,048,393 A | 4/2000 | Cheung et al. | ................... | 106/727 |
| 6,149,725 A | 11/2000 | Burge et al. | ................... | 106/727 |
| 6,213,415 B1 | 4/2001 | Cheung | ................... | 241/22 |
| 6,290,772 B1 | 9/2001 | Cheung et al. | ................... | 106/727 |
| 6,358,311 B1 | 3/2002 | Arai et al. | ................... | 106/808 |
| 2005/0072339 A1* | 4/2005 | Jardine et al. | ................... | 106/808 |
| 2005/0188896 A1* | 9/2005 | Bury et al. | ................... | 106/708 |

FOREIGN PATENT DOCUMENTS

FR    2485949 A1    1/1982

* cited by examiner

*Primary Examiner*—Anthony J. Green
(74) *Attorney, Agent, or Firm*—Craig K. Leon

(57) ABSTRACT

An exemplary method of the invention comprises introducing into a grinding mill, wherein cement clinker is ground to provide cement powder, a diamine such as tetrahydroxylethylethylene diamine, and an alkanolamine such as triethanolamine or triisopropanolamine. The combination of the diamine and alkanolamine provides superior grinding efficiency compared to diamine or alkanolamine added separately.

9 Claims, 2 Drawing Sheets

AMINE-CONTAINING CEMENT PROCESSING ADDITIVES

This is a section 371 application based on International Application No. PCT/US2003/031364, filed Oct. 2, 2003, which claims priority to U.S. Ser. No. 60/417,385, filed on Oct. 9, 2002.

FIELD OF THE INVENTION

The present invention relates to a cement processing aid, and more particularly to a composition comprising an amine and a diamine for enhancing grinding efficiency.

BACKGROUND OF THE INVENTION

Various substances have been known as agents for enhancing the strength of cement cured products, such as mortar and concrete, in which portland cement, mixed cement, etc., has been used. For example, French Patent Application No. FR2485949A1 described the use of tetrahydroxylethylethylene diamine (referred to hereinafter as "THEED") and other similar derivatives of ethylene diamine as cement grinding aids. Grinding efficiency and strength (especially at 28 days) were taught to be better with these materials than with triethanolamine (referred to hereinafter as "TEA"). Also disclosed were reaction products with acetic acid and butylphosphoric acids.

U.S. Pat. No. 4,401,472 disclosed the use of poly(hydroxyalkylated) polyethyleneamine, poly(hydroxyethyl) polyethyleneimine, or mixtures of these used as additives in a cement mix that could include hydraulic cement, aggregate, and water. These additives were deemed to function as strength enhancers for the cementitious mix.

U.S. Pat. No. 5,084,103 disclosed triisopropanolamine and other trialkanolamines used as strength enhancing additives for later age strength (7–28 days). These additives could be admixed with cement powder or interground as a grinding aid during finish milling of the cement clinker.

U.S. Pat. No. 6,290,772 disclosed the use of hydroxylamines including N,N-bis(2-hydroxyethyl)-2-propanolamine and N,N-bis(2-hydroxypropyl)-N-(hydroxyethyl) amine, to enhance the compressive strength of the cement compositions after 1, 3, 7, and 28 days. Also disclosed was a mixture involving other hydroxylamines such as triethanolamine. The patent further taught that these amines could be added as grinding aids in the manufacture of cement.

SUMMARY OF THE INVENTION

Exemplary cement processing compositions of the present invention comprise a diamine, such as tetrahydroxylethylethylene diamine ("THEED"), and an alkanolamine, such as triethanolamine ("TEA"). These compositions provide superior performance as cement processing aids in terms of grinding efficiency.

Exemplary cement processes of the invention comprise introducing a diamine and alkanolamine into a grinding operation in which cement clinker is ground into cement particulates. The invention also relates to cementitious compositions made by such processes. The composition comprise a cementitious binder and the afore-mentioned processing aid compositions.

Still further exemplary compositions of the invention, useful as cement grinding aids or admixture compositions, comprise tetrahydroxylethylethylene diamine and diethanolisopropanolamine, optionally with triethanolamine, for providing early strength to cement.

Further advantages and features of the invention are described in further detailed hereinafter.

DETAILED DESCRIPTION OF EXEMPLARY EMBODIMENTS

Figure 1:
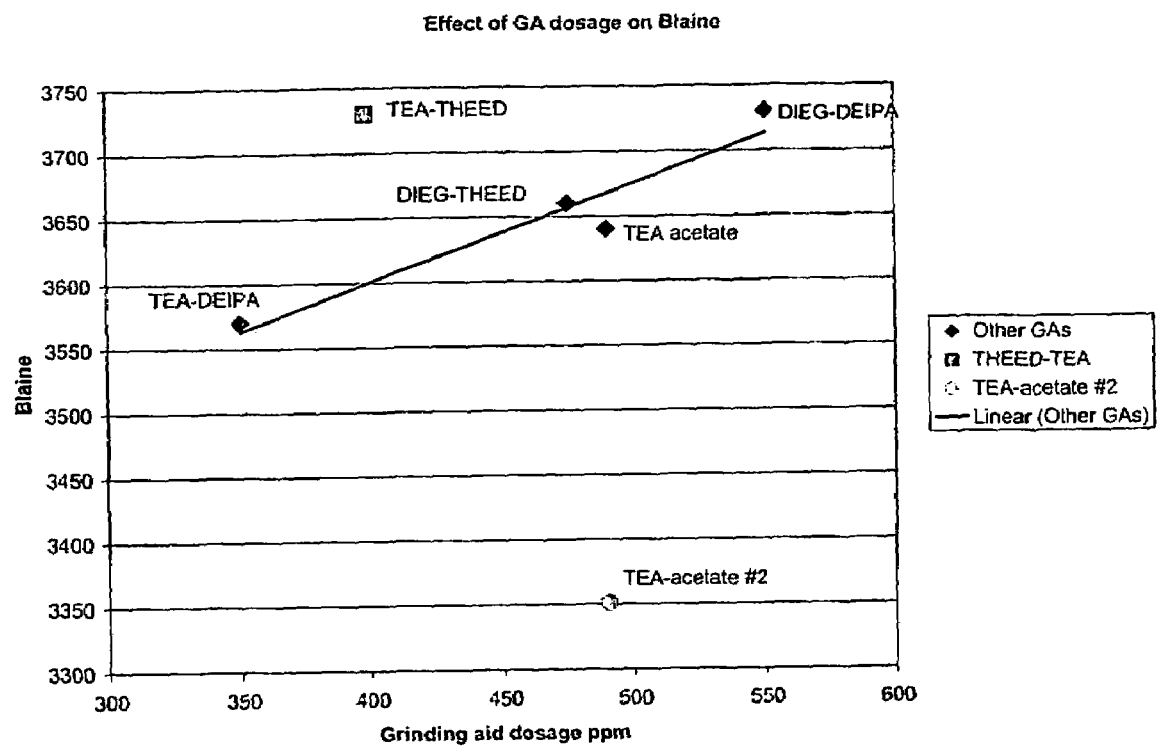
FIG. 1 is a comparative graphic illustration of grinding efficiency, using Type I cement processed at 66 tones per hour, of various amine blends in comparison with an exemplary TEA/THEED blend of the invention.

Portland cement clinker is prepared by sintering a mixture of components including calcium carbonate (as limestone), aluminum silicate (as clay or shale), silicon dioxide (as sand) and miscellaneous iron oxides. During the sintering process, chemical reactions take place wherein hardened nodules, commonly called clinkers, are formed. After the clinker has cooled, it is pulverized together with a small amount of gypsum (calcium sulfate) in a finish grinding mill to provide a fine, homogeneous powdery product known as Portland cement. Thus, an exemplary method of the invention for enhancing a cement grinding process, comprising: introducing, into the grinding of cement clinker to produce cement, an ethylene diamine or derivative thereof; and an alkanolamine.

Cementitious compositions prepared by processes of the invention thus comprise primarily cement made from cement clinker. Accordingly, such compositions preferably have at least 40% by weight of Portland cement, and more preferably at least 80%. Secondary argillaceous or pozzolanic materials may also be mixed with the cement clinker, such as clay, natural pozzolan, flyash, limestone, granulated blast furnace slag, or a mixture thereof, to provide a hydratable cementitious composition.

It is believed that the cement processing aid compositions of the present invention, and processes employing such compositions, are suitable for use on conventional cement grinding mills, including without limitation ball mills and mills having rollers (the latter being described, for example, in U.S. Pat. No. 6,213,415 of Cheung, incorporated herein by reference).

Exemplary cement processing aid compositions of the present invention comprise tetrahydroxylethylethylene diamine ("THEED") and at least one alkanolamine such as triethanolamine ("TEA") or triisopropanolamine ("TIPA"). In preferred compositions, the ratio of THEED:TEA or THEED:TIPA is from 99.5:0.5 to 0.5 to 99.5, and more preferably from 95:5 to 5:95. The dosage by weight on cement can range from 0.001% s/s to 0.5% s/s, with the preferred range being 0.01% to 0.1% s/s.

The cement material of the present invention contains at least the above-mentioned additive for cement materials and cement. It can also contain the above-mentioned additive for cementitious materials, aggregate, and cement. It can further contain other filler materials such as limestone, etc. The lower limit of the content of additive for cementitious materials of the present invention (weight ratio to total weight) is 0.001 wt %, particularly 0.01 wt %, and the upper limit of the same is 0.2 wt %.

The method of adding the additive (the amine and diamine agents) for cementitious materials of the present invention is, for instance, addition during the cement production process. For example, these can be added during pulverization of the mixture of cement clinker, gypsum, limestone, and other such fillers. They can also be added after pulverization. In addition, the additives can be added as each filler material is being ground individually. Moreover, they can also be added after this grinding process. The same is true in the case of using the additives during concrete filler material production, such as production of limestone powder, etc. When the additives of the present invention are added during concrete or mortar production, they can be added to any one of the materials or to several of the materials that will be used. They can also be added during mixing.

The amine/diamine additives for cement materials of the present invention can be concomitantly used with other additives, such as retarders, corrosion inhibiting agents, anti-foaming agents, AE agents, water-reducing agents, AE/water-reducing agents, high-performance water-reducing agents, high-performance AE water-reducing agents, fluidizers, agents to reduce segregation, set accelerators, antifreezing agents, cold-resisting agents, shrink reducing agents, heat of hydration inhibitors, alkali aggregate reaction inhibitors, granulated blast furnace slag, fly ash, silica fume, natural pozzolan, expansive agents, and/or zeolite, etc.

The following examples are provided for the purposes of illustration only, and are not intended to limit the scope of the invention.

In four industrial ball mills which are used for the grinding of cement, combinations of THEED tetrahydroxyethylethylene diamine (hereinafter "THEED") and triethanolamine (hereinafter "TEA") or diethylene glycol (hereinafter "DIEG") were compared to other additives for their effect in enhancing grinding efficiency. These other additives included triethanolamine acetate, as well as combinations of N,N-bis(2-hydroxyethyl)-2-propanolamine (hereinafter "DEIPA") with either DIEG or TEA.

Both TEA (acetate) and DIEG are known cement grinding aids. Blends of DEIPA with TEA or DIEG often give slightly enhanced performance compared to TEA acetate or DIEG alone.

In all four ball mills, blends of THEED with TEA gave evidence of an unexpectedly enhanced performance as grinding aid additives. The present inventor believes that the performance enhancement was also surprising in that it was superior to additives containing DEIPA, which has hitherto been among the better grinding aid enhancers.

In most cases, observed performance in terms of grinding efficiency is for the most part translated as finer ground particle size expressed as higher Blaine ($cm^2/g$). In two of these cases, where Blaine fineness was controlled, other evidence of superior grinding efficiency was noted related to measures taken to control the ball mills to produce uniform cement fineness (Blaine).

EXAMPLE 1

Type I cement is ball milled at a rate of 66 tons per hour. When the combination of TEA and THEED were introduced to the grinding of cement clinker in the ball mill, the efficiency conferred upon the grinding process, which is assessed by measuring the cement fineness (Blaine $cm^2/g$) of the cement processed per dosage of grinding aid, was evaluated and found to be superior to that provided by other grinding aid blends.

An 87% correlation (adjusted $R^2$ by regression analysis) was calculated to exist between total grinding aid dosage and cement fineness (Blaine) for the set of data (excluding TEA/THEED data point) with a P-value under 0.05. This meant that for data points (other than for TEA/THEED combination), 87% of the effect of Blaine fineness was could be attributed to total grinding aid dosage, even though the data point for TEA-acetate had the lowest resultant Blaine per grinding aid dosage.

When the data point for TEA/THEED is included in the regression analysis, the correlation between grinding aid dosage and Blaine drops to 6.4%, with a P-value of 0.34, meaning that Blaine is not just dependent upon grinding aid dosage once this data point is introduced into the analysis. Only 6.4% of the additive's effect on Blaine fineness can be explained by additive dosage alone. The blend of TEA/THEED is producing a unique effect in increasing Blaine fineness, beyond the dosage effect. In examples 3 and 4, increased production for TEA/THEED is demonstrated by either decreased tailings (coarse material returning to the mill for further grinding), or increased feed rate on the mill. Both of these parameters were relatively constant for TEA/THEED compared to other additives tested. (Elevator amps is the energy required, in terms of electric amperage required for moving tailings material (e.g., coarse material) back up to the mill for regrinding). Blaine fineness, clinker feed rate, tailings, and extent of separator opening are all interdependent parameters related to mill production. A favorable indication for production is often noted for only one of these parameters with the other parameters held constant. In this example, as well as example 2, increased Blaine fineness is the indicator of favorable production, while in examples 3 and 4, Blaine fineness is held constant, yet favorable production is reflected by a change in one of the other parameters.

For each sample tested, clinker feed and elevator amps is shown in Table 1.

TABLE 1

| | At sample time | |
| --- | --- | --- |
| | Clinker feed ton/hr | elevator amps |
| TEA-acetate | 64.0 | 35.0 |
| TEA/DEIPA | 62.5 | 32.4 |
| DIEG/DEIPA | 64.7 | 30.5 |
| DIEG/THEED | 64.0 | 33.0 |
| TEA/THEED | 64.0 | 34.0 |
| TEA-acetate#2 | 64.0 | 34.5 |

There is a second TEA-acetate data point whereby the Blaine fineness fell far below that of the other tests. It is unknown why this Blaine was so low. It was the first data point taken during the day.

The results of the TEA/THEED combination, in comparison with other combinations, are shown in the graph of FIG. 1. Blaine vs. GA dosage is plotted for each grinding aid formulation. The plotted line is a linear best fit for all points excluding TEA-THEED, and TEA-acctate#2. The TEA-THEED formulation had the highest Blaine per grinding aid dosage. This data point is significantly far away from the linear relationship established for Blaine vs grinding aid dosage for the other formulations (excluding TEA-acetate #2).

EXAMPLE 2

Analysis on this second mill grinding type III cement processed at the rate of 48 tons per hour revealed that there existed a correlation between Blaine fineness dosage when TEA/THEED and TEA-acetate are excluded from the analysis (64%). This means that the remaining group of additives have about the same grinding effect, and that cement fineness as measured by Blaine ($cm^2/g$) is dependent upon grinding aid dosage. The grinding effect of TEA-acetate is outside of this correlation, bringing the correlation of all points except for TEA/THEED down to 14%. The grinding effect of TEA-acetate is inferior to that of TEA/DEIPA, DIEG/THEED, and Glycol/DEIPA.

TEA/THEED had a measureably superior effect on grinding efficiency. Whether TEA/THEED is included in a group containing TEA-acetate or not, the correlation between dosage and Blaine is 0%, meaning that the grinding effect of TEA/THEED is unique compared to these other additives, and superior.

TABLE 2

| Mill 3 Pts included | Correlation Adjusted R2 | P-value |
| --- | --- | --- |
| All | 0% | 0.83 |
| All except TEA-THEED | 14% | 0.35 |
| All except TEA-THEED and TEA-acetate | 64% | 0.28 |
| All except TEA-acetate | 0% | 0.82 |

Figure 2:
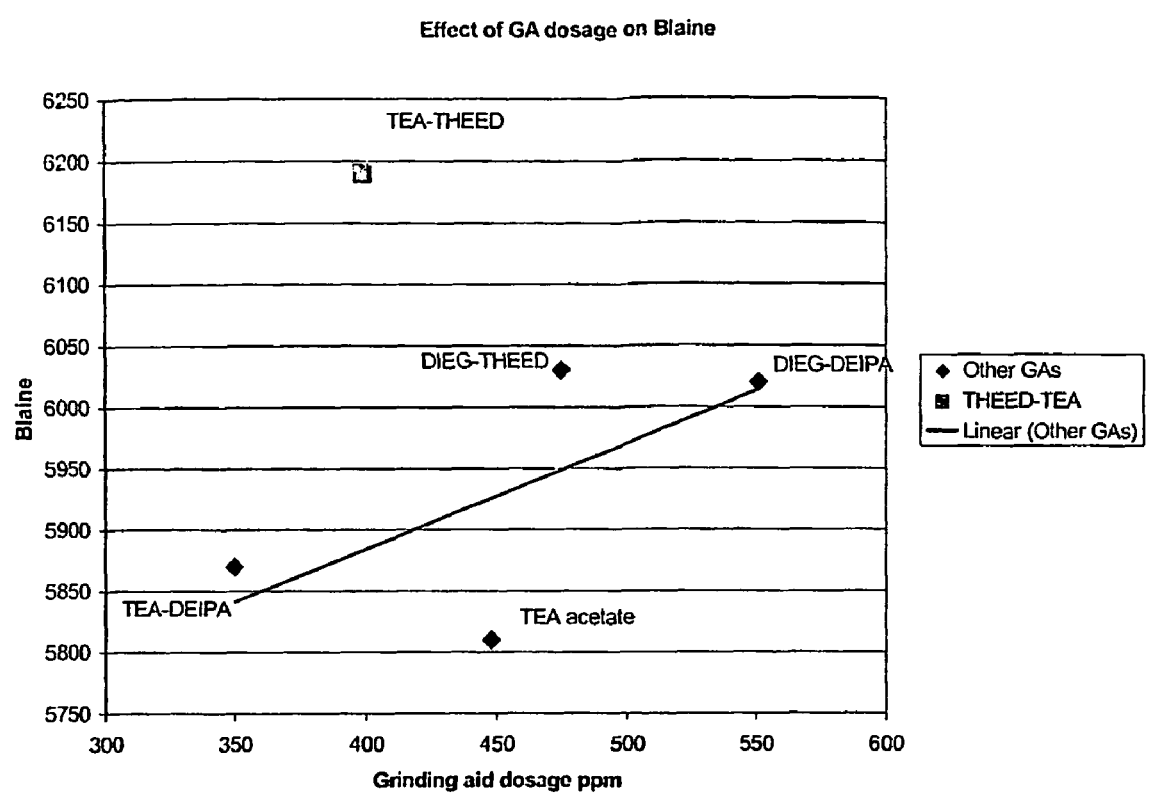
FIG. 2 is a graphic illustration of grinding efficiency, using Type III cement processed at 48 tons per hour, of various amine blends in comparison with an exemplary TEA/THEED blend of the invention.

The effect of grinding aid dosage on Blaine fineness is illustrated in FIG. 2. Blaine vs. GA dosage is plotted for each grinding aid formulation. The plotted line is a linear best fit for all points excluding TEA-THEED. The TEA-THEED formulation had the highest Blaine per grinding aid dosage. This data point is significantly far away from the linear relationship established for Blaine vs grinding aid dosage for the other formulations.

Regarding the other parameters related to grinding efficiency, both DIEG/DEIPA and DIEG/THEED show a decrease in elevator amps, as does TEA/THEED, when compared to TEA-acetate. Clinker feed for all additives tested is within 1 ton/hr.

TABLE 3

| | At sample time | |
| --- | --- | --- |
| | Clinker feed ton/hr | elevator Amps |
| TEA-acetate | 44 | 45 |
| TEA/DEIPA | 42 | 42 |
| DIEG/DEIPA | 43 | 35 |
| DIEG/THEED | 43 | 35 |
| TEA/THEED | 43 | 35 |

EXAMPLE 3

In another cement grinding mill, wherein Type I cement is processed at a rate of 50 tons per hour, Blaine fineness had a linear correlation with grinding aid dosage, and based on this analysis TEA/THEED did not emerge to be a superior product. The adjusted R2 for the regression analysis of the data in this set was 69.5% with a P value of 0.05. Yet data output obtained for this mill showed that the average material returned to the mill by the separator was the lowest for TEA/THEED. This is reflected by the low reading for the tailings impact flow meter and the low grinding performance ratio (GPR). The lower the GPR for the same feed, the lower the material being returned to the mill from the separator. The lower tailings and GPR for TEA/THEED are particularly significant when comparing TEA/THEED to TEA-acetate, both with equal total feed rates.

TABLE 2

| Mill @ ~50 ton/hr, type I cement | Additive ppm | Blaine cm2/g | total feed ton/hr | tailings impact flow meter - tph | grinding performance ratio |
| --- | --- | --- | --- | --- | --- |
| TEA-acetate | 403 | 3883 | 50.5 | 199.7 | 2.42 |
| DIEG/THEED | 480 | 3940 | 47.5 | 197.4 | 2.62 |
| TEA/THEED | 399 | 3808 | 50.6 | 161.9 | 1.66 |
| TEA/DEIPA | 350 | 3808 | 45.0 | 165.0 | 2.20 |
| DIEG/DEIPA | 475 | 4026 | 53.2 | 174.0 | 1.76 |

EXAMPLE 4

In a fourth mill processing Type II cement at a rate of 30 tons per hour, all of the data, including TEA/THEED showed a linear correlation between grinding aid dosage and Blaine, with an adjusted R2 of 72.5% and a P-value of 0.096. When the TEA/THEED sample was taken, the total clinker and gypsum feed to the mill was 33.5 ton/hr. The clinker and gypsum feed for TEA-acetate was 30.9 ton/hr. The clinker and gypsum feed for all other additives tested was somewhere in between these values. High allowed feed rate with TEA/THEED indicates a high grinding efficiency for the additive.

EXAMPLE 5

Further testing was done on mixtures of tetrahydroxylethylethylene (THEED) and diethanolisopropanolamine (DEIPA). First, blank samples of cement mortar, using type 1 cement from the U.K., was mixed with water and cured. One day average strength for five samples (control) was determined to be 19.2 MPa (megapascals). Next, cement mortars containing THEED and DEIPA, each at 25 ppm (based on weight of cement), were tested. One day strength for the combination was determined to be 109% of the control, 112% of THEED alone, and 114% of DEIPA alone. One day strength was determined to be 111% of 50 ppm DIEPA. The results are contained in Table 3 below:

TABLE 3

| THEED | DEIPA | | 1 day strength (Mpa) |
| --- | --- | --- | --- |
| ppm | ppm | Average | 19.2 |
| 25 | | | 18.4 |
| 25 | | | 18.9 |
| | | Average | 18.7 |
| | 25 | | 18.3 |
| 25 | 25 | | 20.9 |
| | 25 | | 18.8 |

The experiment was then repeated with 20 ppm THEED and 50 ppm DEIPA. One day strength for the combination was determined to be 114% of the control, 107% of THEED alone, and 113% of DEIPA alone. The results are contained in Table 4 below:

TABLE 4

| THEED | DEIPA | 1 day strength (Mpa) |
|---|---|---|
| | Average | 18.6 |
| 20 | | 20.0 |
| | 50 | 18.8 |
| 20 | 50 | 21.3 |

The experiment was repeated this with 10 ppm THEED and 25 ppm DEIPA. One day strength for the combination was determined to be 115% of the control, 112% of THEED alone, and 120% of DEIPA alone. The results are tabulated in Table 5 below:

TABLE 5

| THEED | DEIPA | 1 day strength (Mpa) |
|---|---|---|
| | Average | 19.1 |
| 10 | | 19.7 |
| | 25 | 18.3 |
| 10 | 25 | 22.0 |

Thus, from the foregoing data, it was determined that blends of 25% THEED and 75% DEIPA were preferred for improving early strength when admixed into in cementitious compositions. Accordingly, a preferred composition of the invention, for admixing into a cement composition, or indeed for adding into a cement intergrinding process, comprises THEED in the amount of 20–30% and DEIPA in the amount of 70–80% by weight of total composition.

Further exemplary compositions of the invention comprise a blend of THEED (e.g., 28–38%), DEIPA (53–63%), and TEA (9–19%), with blends of THEED (33%), DEIPA (8%), and TEA (58%) considered optimum for providing strength enhancement to cements and concretes.

The foregoing is provided by way of illustration and is not intended to limit the scope of the invention.

I claim:

1. A method for grinding cement, comprising:
   introducing into a grinding mill, wherein cement clinker is ground to produce cement, tetrahydroxylethylethylene diamine or derivative thereof and an alkanolamine selected from the group consisting of triethanolamine, triisopropanolamine, and diethanolisopropanolamine, the ratio of said tetrahydroxylethylethylene diamine or derivative thereof to said alkanolamine being 95:5 to 5:95 based on weight, and the dosage of said tetrahydroxylethylethylene diamine or derivative thereof and said alkanolamine to cement being no less than 0.001% and no greater than 0.5% based on weight solids of said tetrahydroxylethylethylene diamine or derivative thereof and said alkanolamine to weight solids of cement (s/s); and
   grinding said tetrahydroxylethylethylene diamine or derivative thereof and said alkanolamine with cement clinker to produce cement powder.

2. The method of claim 1 wherein the dosage of said tetrahydroxylethylethylene diamine or derivative thereof and said alkanolamine in terms of their weight solids based on weight solids of cement is 0.01% to 0.1%.

3. The method of claim 1 comprising incorporating, into said cement clinker being around in said grinding mill, tetrahydroxylethylethylene diamine or derivative thereof in the amount of 28–38%, triethanolamine in the amount of 9–19%, and diethanolisopropanolamine in the amount of 53–63%, said percentages based on the total weight of said tetrahydroxylethyleethylene diamine or derivative thereof, said triethanolamine, and said diethanolisopropanolamine being incorporated into said grinding mill.

4. The method of claim 1 wherein said tetrahydroxylethylethylene diamine or derivative thereof and said alkanolamine being ground with the cement clinker are operative to said enhance Blame fineness of cement produced from the grinding of said cement clinker when compared to grinding the cement clinker using said tetrahydroxylethylethylene diamine or derivative thereof or said alkanolamine separately.

5. The method of claim 1 wherein said grinding of said cement clinker occurs in a closed-circuit grinding mill wherein coarse ground material is returned into said mill for further grinding, said tetrahydroxylethylethylene diamine or derivative thereof and said alkanolamine are operative to decrease the amount of coarse material returned to the mill for further grinding.

6. The method of claim 1 wherein said tetrahydroxylethylethylene diamine or derivative thereof and said alkanolamine being ground with the cement clinker are operative to enhance the strength of the cement.

7. A cement powder composition provided by the method of claim 1.

8. The composition of claim 7 wherein said tetrahydroxylethylethylene diamine or derivative thereof is present in the amount of 20–30% and said alkanolanolamine is diethanolisopropanolamine which is present in the amount of 80–70%, said percentages based on total weight of said composition.

9. The composition of claim 8 further comprising triethanolamine.

* * * * *